(12) United States Patent
Chen et al.

(10) Patent No.: US 7,429,058 B2
(45) Date of Patent: Sep. 30, 2008

(54) PASSENGER AIRBAG DOOR

(75) Inventors: Chihan Chen, Rochester Hills, MI (US); George J Zamplas, Novi, MI (US); William M Snell, Grand Blanc, MI (US)

(73) Assignee: Chrysler LLC, Auburn Hills, MI (US)

( * ) Notice: Subject to any disclaimer, the term of this patent is extended or adjusted under 35 U.S.C. 154(b) by 469 days.

(21) Appl. No.: 11/205,700

(22) Filed: Aug. 17, 2005

(65) Prior Publication Data
US 2007/0040359 A1 Feb. 22, 2007

(51) Int. Cl.
*B60R 21/205* (2006.01)
(52) U.S. Cl. ................... 280/728.3; 280/732
(58) Field of Classification Search ............. 280/728.3, 280/752, 732
See application file for complete search history.

(56) References Cited
U.S. PATENT DOCUMENTS

| | | | | |
|---|---|---|---|---|
| 5,316,334 A | * | 5/1994 | Skidmore | 280/728.3 |
| 5,738,366 A | * | 4/1998 | Phillion | 280/728.2 |
| 6,203,056 B1 | * | 3/2001 | Labrie et al. | 280/728.3 |
| 6,354,623 B1 | * | 3/2002 | Delmastro | 280/732 |
| 7,178,825 B2 | * | 2/2007 | Fujii et al. | 280/728.3 |
| 2002/0149182 A1 | * | 10/2002 | Yasuda | 280/732 |
| 2004/0075251 A1 | * | 4/2004 | Fujii et al. | 280/728.3 |
| 2006/0033313 A1 | * | 2/2006 | Horiyama | 280/728.3 |

* cited by examiner

*Primary Examiner*—Ruth Ilan
*Assistant Examiner*—Drew J. Brown
(74) *Attorney, Agent, or Firm*—Alexander Zelikov

(57) ABSTRACT

A passenger side airbag installation for an automotive vehicle has a passenger airbag module mounted in a vehicle compartment in front of an instrument panel. The airbag module has an airbag adapted to deploy in a rearward direction. A door formed integrally with the panel has a crease, which, when severed, allows the door to swing open and create an opening in the panel. The crease is adapted to be severed and the door swung open by the force of the airbag when the airbag deploys to permit the airbag to project through the opening. The door may be bowed forwardly by an accidental impact caused by a passenger or object within the vehicle being thrown against the door if the vehicle is stopped too suddenly. A reinforcing bar limits forward bowing to protect the crease from rupturing.

6 Claims, 3 Drawing Sheets

PASSENGER AIRBAG DOOR

FIELD OF THE INVENTION

This invention relates generally to airbag installations for motor vehicles and more particularly to a passenger side airbag installation having an improved door in the instrument panel for permitting the deployment of the airbag.

BACKGROUND OF THE INVENTION

A typical passenger side airbag installation includes an airbag module mounted in a compartment in front of the instrument panel. The airbag module has an airbag which deploys in a rearward direction. A door in the instrument panel has a crease, which, when severed, allows the door to swing open and create an opening in the instrument panel. The crease is severed and the door is swung open by the force of the airbag when the airbag deploys to permit the airbag to project through the opening. One of the problems is that when there is an accidental impact against the door from inside the vehicle, as when the vehicle stops suddenly and the head of a passenger or any other object is thrown forwardly and strikes the door, the door may bow inwardly and rupture the crease. A ruptured crease requires installing a completely new instrument panel at considerable expense.

SUMMARY OF THE INVENTION

In order to prevent or at least limit the inward bowing of the door by an impact from the inside of the vehicle, a reinforcing member is provided. In accordance with the specific embodiment about to be disclosed, this reinforcing member is in the form of an elongated bar extending across the front side of the door. The airbag module includes a canister in which the airbag is contained. Forward bowing of the door is stopped by the reinforcing bar making contact with the canister. As a result, the amount of any forward bowing of the door is so small that the crease will not be broken or ruptured.

One object of this invention is to provide a passenger airbag installation having one or more of the foregoing features and capabilities. Other objects, features and advantages will become more apparent as the description proceeds.

Further areas of applicability of the present invention will become apparent from the detailed description provided hereinafter. It should be understood that the detailed description and specific examples, while indicating preferred embodiments of the invention, are intended for purposes of illustration only and are not intended to limit the scope of the invention.

BRIEF DESCRIPTION OF THE DRAWINGS

The present invention will become more fully understood from the detailed description and accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
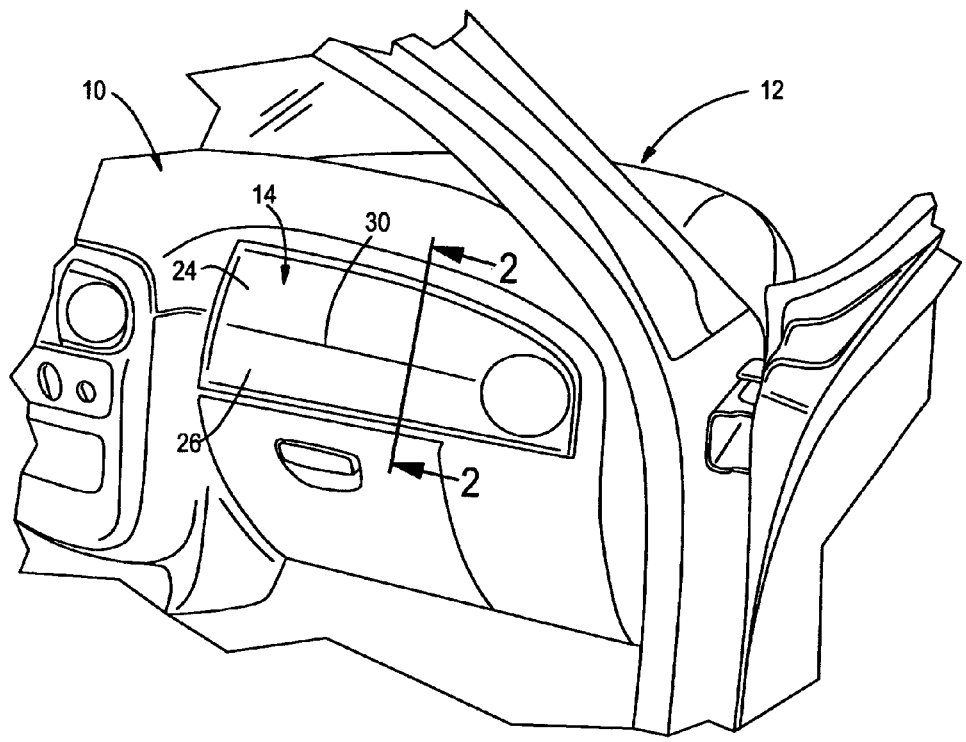
FIG. 1 is a fragmentary perspective view showing the instrument panel of an automotive vehicle having a door closing a vehicle compartment in which an airbag module is mounted, constructed in accordance with this invention.
Figure 2:
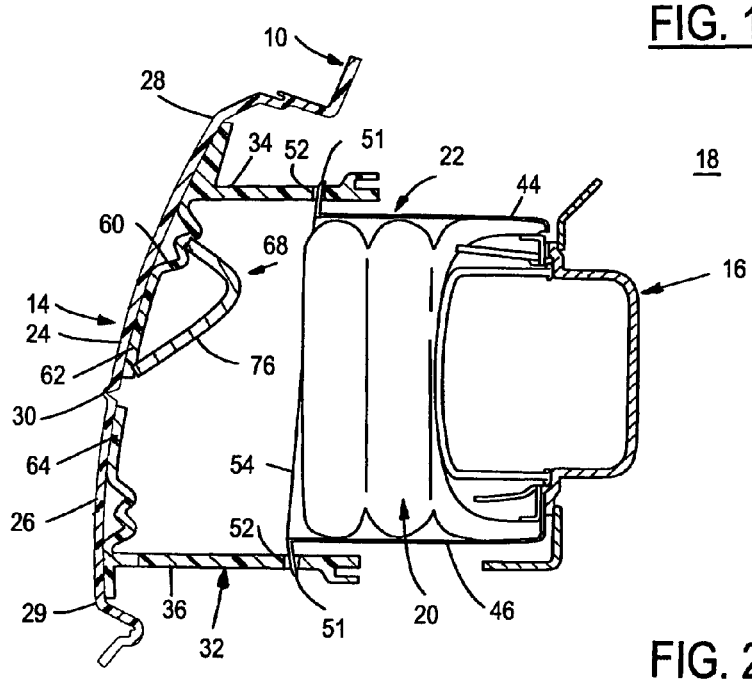
FIG. 2 is a sectional view taken on the line 2-2 in FIG. 1.
Figure 3:
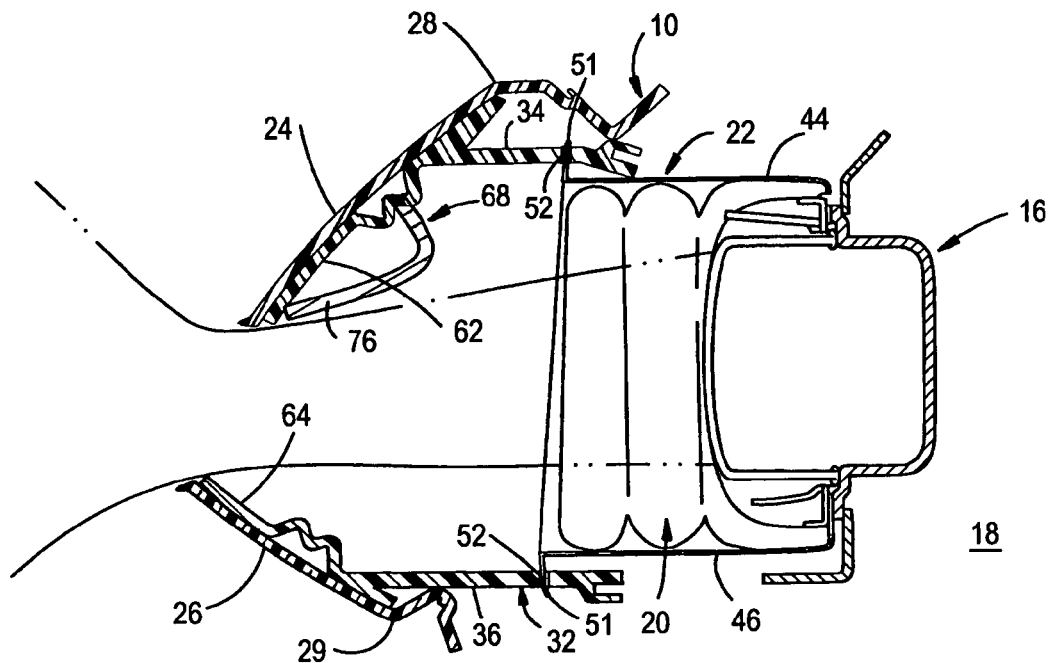
FIG. 3 is a view similar to FIG. 2 but showing the door open to allow a deployed airbag to project through the opening.
Figure 4:
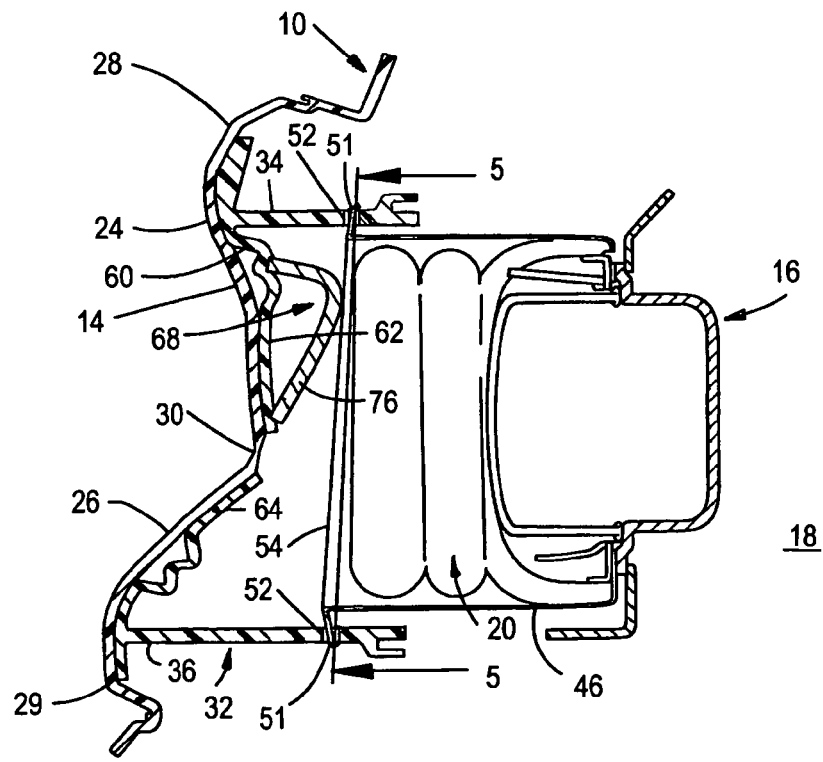
FIG. 4 is a view similar to FIG. 2 but showing the door bowed slightly in a forward direction resulting from an impact against the door from the inside of the vehicle.
Figure 5:
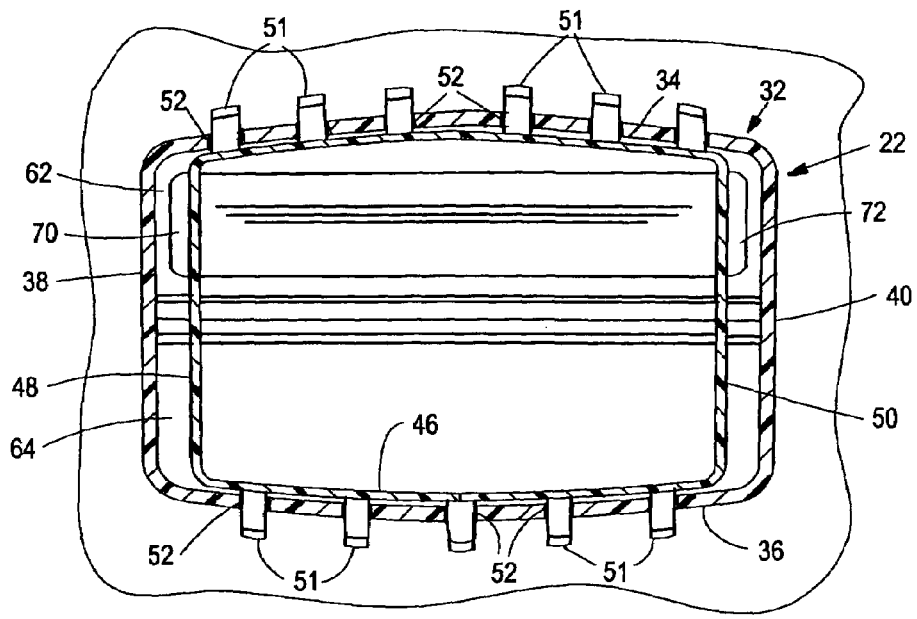
FIG. 5 is a sectional view taken on the line 5-5 in FIG. 4.

Referring now more particularly to the drawings and especially to FIGS. 1 and 2, there is shown an instrument panel 10 of an automotive vehicle 12. A passenger airbag installation includes a door 14 on the passenger side of the instrument panel, and an airbag module 16 mounted in a vehicle compartment 18 in front of the door. The airbag module 16 has an airbag 20 folded inside a canister 22. The door 14 is formed integrally with the instrument panel and has a top section 24 and a bottom section 26. The generally horizontal upper edge of the top section 24 of the door has a living hinge connection to the instrument panel at 28 and the generally horizontal lower edge of the bottom section 26 of the door has a living hinge connection to the instrument panel at 29. The adjacent edges of the top and bottom sections 24 and 26 of the door 14 meet and are integrally joined together and defined by a horizontal crease 30 of reduced thickness in the instrument panel.

The airbag module 16 is telescoped inside a hollow chute 32 secured within the compartment 18. The chute 32 is preferably made of a somewhat flexible resinous plastic material. The chute provides a tunnel to direct the rearward deployment of the airbag 20. The chute 32 has top and bottom walls 34 and 36 and sidewalls 38 and 40. The canister 22 has top and bottom walls 44 and 46 and sidewalls 48 and 50. The top and bottom walls 44 and 46 of the canister have tabs 51 projecting through slots 52 in the top and bottom walls 34 and 36 of the chute 32 to secure the canister 22 in position within the chute. The rear edges of the sidewalls 48 and 50 of the canister are indicated at 54.

The chute 32 has an integral flexible transverse partition 60 having an upper part 62 along the front side of the top section 24 of the door and a lower part 64 extending along the front side of the lower section 26 of the door.

A rigid reinforcing member is secured to the front side of the upper part 62 of the partition 60 in front of the upper section 24 of the door above the crease 30. The reinforcing member is in the form of an elongated horizontal bar 68. The bar 68 is of a length greater than the distance between the sidewalls 48 and 50 of the canister so that the end portions 70 and 72 of the bar extend laterally outwardly beyond the rear edges 54 of the sidewalls 48 and 50 of the canister.

The bar has a cross section generally in the shape of an L with the convex side facing forwardly, and with a lower wall 76 sloping from the projecting corner or trough of the L downwardly and rearwardly toward the crease 30. This lower wall 76 of the reinforcing bar 68 is shaped to direct the deploying airbag through the door opening. The reinforcing bar therefore does not impede the deployment of the airbag but actually facilitates it.

In the normal operation of the airbag installation, when a crash or any sudden and violent vehicle impact occurs, the airbag deploys against the two door sections 24 and 26. The crease 30 is ruptured or severed and the sections 24 and 26 of the door are swung open by the force of the deploying airbag to permit the airbag to be projected through the opening formed by the open door.

Occasionally, the door 14 is struck from the inside of the vehicle. This may occur when the vehicle is stopped suddenly, causing a passenger or any other object to be thrown forwardly. When a passenger is thrown forwardly, usually it is the head of the passenger that strikes the upper section 24 of the door. Without the reinforcing bar 68, the door may be bowed forwardly so far that the crease 30 will rupture, and thus destroy the appearance and utility of the instrument panel.

The purpose of the reinforcing bar 68 is to limit the forward bowing of the door 14 to such a small extent that it will not cause actual severing of the crease. After bowing forwardly, the door will snap back and not be damaged. Forward bowing is limited by engagement of the outer end portions 70 and 72 of the reinforcing bar 68 with the rear edges 54 of the canister.

Figure 6:
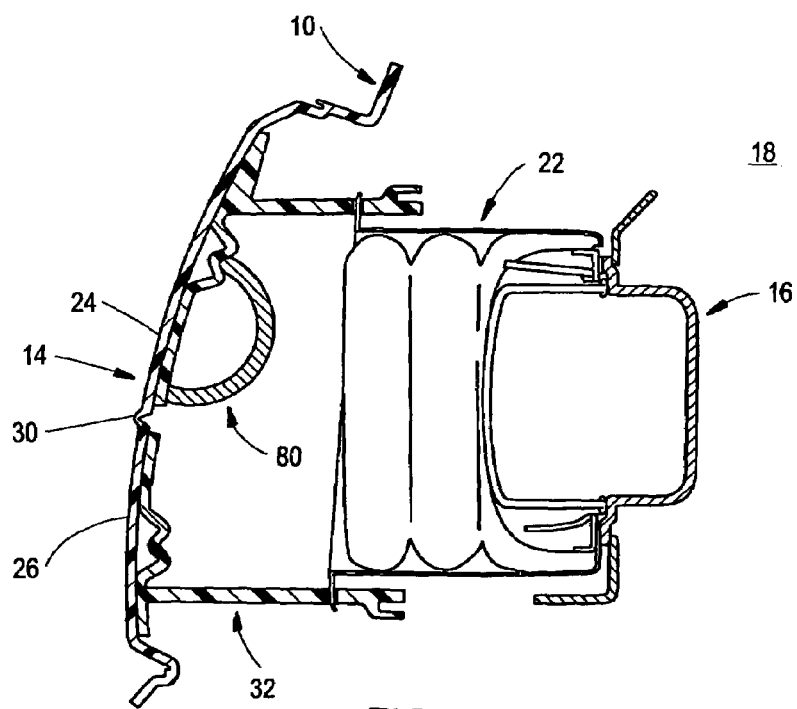
FIG. 6 is a sectional view similar to FIG. 2 but showing a reinforcing bar of a different cross section.

FIG. 6 shows an embodiment which is like the embodiment of FIGS. 1-5 except that the reinforcing bar 80 is semi-cylindrical in cross section rather than of the configuration of the reinforcing bar 68.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A passenger side airbag installation for an automotive vehicle, comprising:

a passenger airbag module mounted in a vehicle compartment in front of an instrument panel, said airbag module having an airbag adapted to deploy in a rearward direction, a door formed integrally with the instrument panel and having a crease, which, when severed, allows, the door to swing open and create an opening in the instrument panel, said crease being severed and the door swung open by the force of the airbag when the airbag deploys to permit the airbag to project through the opening, and a reinforcing member operative to limit forward bowing of the door as may result from an accidental impact against the door caused by a passenger or object within the vehicle;

wherein said airbag module includes a canister in which the airbag is contained, said reinforcing member comprises an elongated horizontal bar extending across a front side of the door, and the forward bowing of the door is limited by engagement of opposite ends of the bar with the canister.

2. The passenger side airbag installation of claim 1, wherein the airbag module is mounted in a chute providing a tunnel to direct the rearward deployment of the airbag, the canister being telescoped within the chute.

3. The passenger side airbag installation of claim 2, wherein the door has an upper section and a lower section, the door swings open along an upper edge of the upper section and a lower edge of the lower section, and the upper and lower sections of the door have confronting edges defined by the crease.

4. The passenger side airbag installation of claim 3, wherein the chute has a transverse partition along the front side of the upper section of the door, and the reinforcing bar is mounted on the partition in front of the upper section of the door above the crease.

5. The passenger side airbag installation of claim 4, wherein the bar has a cross-section generally in the shape of an L having a convex side facing forwardly with a lower wall sloping from a trough of the L downwardly and rearwardly toward the crease.

6. The passenger side airbag installation of claim 4, wherein the bar is generally semi-circular in cross section having a convex side facing forwardly.

* * * * *